(12) United States Patent
Williams et al.

(10) Patent No.: US 12,732,031 B2
(45) Date of Patent: Sep. 8, 2026

(54) MODULAR STATOR FOR DOWNHOLE ELECTRIC MOTORS

(71) Applicant: Baker Hughes Oilfield Operations LLC, Houston, TX (US)

(72) Inventors: Gary Williams, Broken Arrow, OK (US); Shawn Gunter, Owasso, OK (US); Yong Li, Mequon, WI (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 212 days.

(21) Appl. No.: 18/296,327

(22) Filed: Apr. 5, 2023

(65) Prior Publication Data

US 2023/0318367 A1 Oct. 5, 2023

Related U.S. Application Data

(60) Provisional application No. 63/327,626, filed on Apr. 5, 2022.

(51) Int. Cl.

| | |
|---|---|
| ***H02K 1/16*** | (2006.01) |
| ***E21B 43/12*** | (2006.01) |
| ***H02K 3/50*** | (2006.01) |
| ***H02K 5/132*** | (2006.01) |
| ***H02K 7/08*** | (2006.01) |

(52) U.S. Cl.

CPC ............ *H02K 1/16* (2013.01); *E21B 43/128* (2013.01); *H02K 3/50* (2013.01); *H02K 5/132* (2013.01); *H02K 7/083* (2013.01); *H02K 2203/06* (2013.01); *H02K 2213/12* (2013.01)

(58) Field of Classification Search

CPC ........... H02K 1/16; H02K 3/50; H02K 5/132; H02K 7/083; H02K 2203/06; H02K 2213/12; H02K 7/14; H02K 2207/03; E21B 43/128

See application file for complete search history.

(56) References Cited

U.S. PATENT DOCUMENTS

| | | | | |
|---|---|---|---|---|
| 6,794,788 B1 * | 9/2004 | Smith | .................... | H02K 5/132 310/71 |
| 10,840,788 B2 * | 11/2020 | McMullen | .............. | E21B 4/003 |
| 2021/0320578 A1 * | 10/2021 | Sheth | ..................... | H02K 11/21 |
| 2021/0372244 A1 * | 12/2021 | Riachentsev | ....... | F04D 13/0673 |

* cited by examiner

*Primary Examiner* — Kristyn A Hall
(74) *Attorney, Agent, or Firm* — Sprinkle IP Law Group

(57) ABSTRACT

Motors for use in downhole systems such as electric submersible pumps. In one embodiment, an ESP system includes a pump and a motor which drives the pump. The motor has an elongated cylindrical stator and a rotor which is concentrically positioned within a bore through the stator. The rotor is driven by the stator to rotate within the bore. The stator comprises a plurality of separable, interconnected modular stator sections which may be identical. Between each pair of adjacent stator sections, a corresponding interconnect electrically connects coils of magnet wire in the stator sections to a power source. In some cases, the interconnect between stator sections electrically connects the coils of magnet wire serially in the adjacent stator sections. In other embodiments, the coils in adjacent stator sections are connected in parallel the power source.

12 Claims, 4 Drawing Sheets

MODULAR STATOR FOR DOWNHOLE ELECTRIC MOTORS

RELATED APPLICATION(S)

The present application claims the benefit of priority under 35 U.S.C. § 119(e) of U.S. Provisional Patent Application No. 63/327,626 filed Apr. 5, 2022, entitled “Modular Stator for Downhole Electric Motors,” which is hereby fully incorporated by reference herein.

BACKGROUND

Field of the Invention

The invention relates generally to electric motors, and more particularly to systems and methods for construction of elongated electric motors in which the stator is manufactured in modular sections that can be used in combination to construct motors of varying lengths while avoiding some disadvantages of motors that use a single elongated stator.

Related Art

Oil and natural gas are often produced by drilling wells into oil reservoirs and then removing the oil and gas from the reservoirs. If there is insufficient pressure in a well to force these fluids out of the well, it may be necessary to use an artificial lift system in order to extract the fluids from the reservoir through the well. A typical artificial lift system employs an electric submersible pump (ESP) which is positioned in a producing zone of the well to pump the fluids out of the well.

An ESP system includes a pump and a motor which is coupled to the pump and drives the pump to lift fluid out of the well. Because they are designed to fit within the borehole of a well, ESP systems are typically very narrow (e.g., less than ten inches wide), but may be tens of meters long.

The size, and particularly the length, of downhole motors for ESPs present difficulties in the manufacture and operation of ESPs. For instance, these motors conventionally use a single section stator that extends the length of the motor. Because the motor may be very long, drawing magnet wire through the stator to create the magnet coils of the stator can be very difficult, and can result in low copper fill in the stator (where “fill” refers to the percentage of each stator slot that is filled with the copper magnet wire).

Another problem is that, in conventionally constructed motors, the coils of the stator extend continuously along substantially the entire length of the motor. The rotor, on the other hand, is not continuous, but instead has bearings positioned at intervals along the length of the rotor to support the rotor in the center of the stator’s bore. The portions of the stator coils adjacent to the bearings incur power losses, but since there is no corresponding magnet at this position on the rotor, no torque is generated by this portion of the rotor.

Further, a variable frequency drive is commonly used to drive the motor, and when portions of the stator coils are adjacent to the bearings, high frequency spikes that are not filtered generated by the variable frequency drive cause pitting of the bearings. This pitting degrades the operation of the motor and reduces the motor’s effective life.

Yet another problem with conventionally constructed motors is that the manufacture of customized motors with different lengths is inefficient because the stator is not standardized. The manufacturing process therefore has to be modified to adapt it to each customized stator, which can result in greater time and labor requirements and a higher risk of manufacturing errors form changes in the process.

It would therefore be desirable to provide systems and methods for reducing or eliminating these problems in the manufacture and operation of conventional downhole motors for ESPs.

SUMMARY

One embodiment comprises an ESP system. The ESP system includes a pump and a motor which drives the pump. The motor has an elongated cylindrical stator and a rotor which is concentrically positioned within a bore through the stator. The rotor is driven by the stator to rotate within the bore. The stator comprises a plurality of separable, interconnected modular stator sections. In some embodiments, each of the modular stator sections is identical. Between each pair of adjacent stator sections, a corresponding interconnect electrically connects coils of magnet wire in the stator sections to a power source. In some embodiments, the interconnect between stator sections electrically connects coils of magnet wire in a first one of the pair of adjacent stator sections to coils of magnet wire in a second one of the pair of adjacent stator sections in a serial configuration. In other embodiments, the coils of magnet wire in successive ones of the stator sections are connected by the interconnect to a power source in parallel to each other.

In some embodiments, the interconnect for each pair of adjacent stator sections comprises a set of connectors which are engaged by securing the pair of adjacent stator sections to each other. Each of the stator sections may have a corresponding stator housing, where the stator housing of each stator section has, at each end, a corresponding flange configured to secure the stator housing to the stator housing of the adjacent stator section. Each flange may have a subset of the connectors mounted on it, such that when facing flanges of adjacent stator sections are secured to each other, the connectors mounted on the facing flanges are engaged with each other.

In some embodiments, for each pair of adjacent stator sections, the corresponding interconnect includes a first end portion of a first one of the pair of adjacent stator sections and a second end portion of a second one of the pair of adjacent stator sections. Each of the stator sections in these embodiments has a corresponding stator core, where for each of the stator sections, the corresponding stator core does not extend axially into the end portion of the corresponding stator section. Each pair of adjacent stator sections may have a corresponding bearing positioned within the end portions of the pair of adjacent stator sections, where the bearing supports the shaft of the rotor. In some embodiments, the stator has gaps between stator cores of the stator sections, and the rotor has rotor core sections which are separated by bearings that support the shaft of the rotor, where the bearings are positioned at axial locations which are coincident with the gaps between stator cores of the stator sections. In some embodiments, the rotor core sections are coextensive with the stator cores of the stator sections.

An alternative embodiment comprises a downhole motor that has an elongated cylindrical stator and a rotor which is concentrically positioned within a bore through the stator and is driven by magnetic fields generated by the stator to rotate within the bore. The stator has multiple separable interconnected modular stator sections. Each stator section has a set of connectors that engage a corresponding set of connectors of an adjacent one of the stator sections to electrically connect coils of magnet wire in the stator section to coils of magnet wire in the adjacent stator section. The stator has a gap between the stator cores of each pair of adjacent stator sections. The stator also has multiple bearings that support the shaft of the rotor, where the bearings are positioned at axial locations which are coincident with the gaps between the stator cores of the adjacent stator sections. Each of the stator sections may have a corresponding stator housing that has, at each end, a corresponding flange configured to secure the stator housing to the stator housing of the adjacent stator section. Each flange has a subset of the connectors mounted on it, where the connectors engage with corresponding connectors of the adjacent stator section when the flanges of the adjacent stator sections are secured to each other.

BRIEF DESCRIPTION OF THE DRAWINGS

Other objects and advantages of the invention may become apparent upon reading the following detailed description and upon reference to the accompanying drawings.

Figure 1:
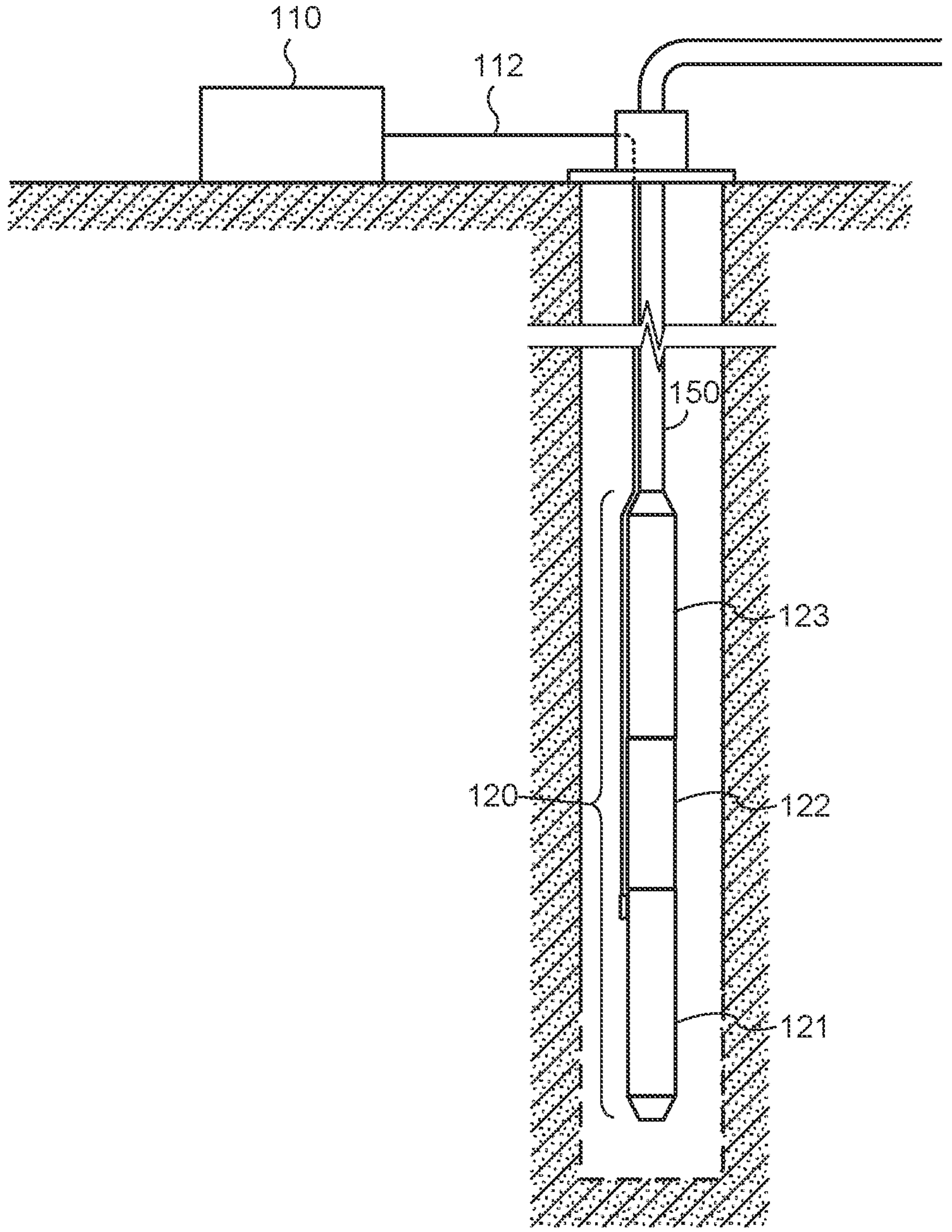
FIG. 1 is a diagram illustrating some of the primary components of an ESP system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for using modular stator sections to manufacture motors of different lengths and power ratings, wherein embodiments may reduce electrical losses in portions of the stator coils adjacent to the bearings, reduce pitting in bearings, reduce complexity, cost, and difficulty in processes for manufacturing, reduce inventory requirements while providing motors of different lengths and power ratings, facilitate serial or parallel connection of stator windings, etc.

Before describing exemplary embodiments of the invention, it may be helpful to review the overall structure of a conventional motor for an ESP. Referring to FIG. 1, a diagram illustrating an exemplary ESP system is shown. In this figure, an ESP system is installed in a well. An ESP 120 is coupled to the end of tubing string 150, and the ESP and tubing string are lowered into the wellbore to position the ESP in a producing portion of the well (as indicated by the dashed lines at the bottom of the wellbore). Surface equipment which includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

In this embodiment, ESP 120 includes a motor section 121, seal section 122, and pump section 123. ESP 120 may include various other components which will not be described in detail here because they are well known in the art and are not important to a discussion of the invention. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112.

Figure 2:
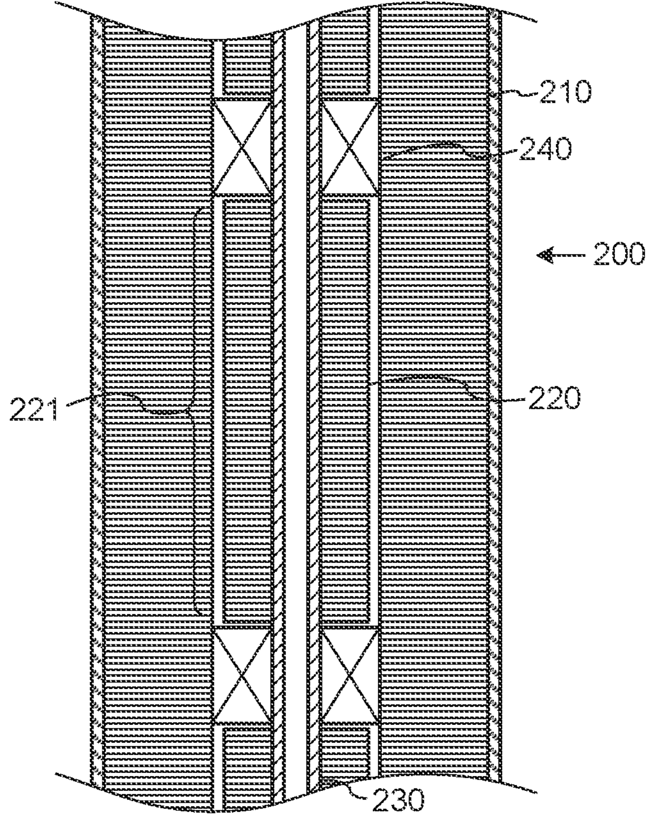
FIG. 2 is a diagram illustrating an exemplary structure of a motor suitable for use in an ESP system as shown in FIG. 1.

Referring to FIG. 2, a diagram illustrating the structure of an exemplary structure of a motor 200 is shown. As depicted in this figure, motor 200 has a stator 210 and a rotor 220. Stator 210 is generally cylindrical, with a coaxial bore that runs through it. Rotor 220 is coaxially positioned within the bore of stator 210. Rotor 220 actually includes multiple rotor sections (e.g., 221), each of which is attached to a shaft 230 that is coaxial with the rotor and stator 210. Bearings (e.g., 240) are positioned at the ends of each rotor section. The bearings support shaft 230, and consequently rotor 220, within the bore of stator 210 and allow the rotor and shaft to rotate within the stator.

It should be noted that, in the diagram of FIG. 2, bearings 240 are positioned directly adjacent to portions of stator 210. As noted above, since the bearings do not generate any torque to drive the rotational motion of shaft 230, energy that is provided to the portion of the stator coils at this location is wasted. Further, the magnetic fields generated by the stator at this location can cause pitting of bearings 240 due to high frequency spikes from the variable frequency drive. This can degrade the effectiveness of the bearings. Both the wasted energy and the reduced effectiveness of the bearings can reduce the efficiency of the motor.

As noted above, a downhole motor for an ESP is commonly very narrow and quite long (e.g., tens of meters). The stator of such a motor is typically a single unit having coils of magnet wire which along the entire length of the stator. These coils are positioned within passageways ("slots") that extend through the stator. Conventionally, the coils are installed in the spots by pulling the magnet wire in a first direction through a first slot, then pulling the wire through a second slot in the opposite direction two form a first loop or "turn" of the coil, and repeating this process to form the desired number of turns of wire in the coil.

Pulling the magnet wire through the slots is a difficult process and the wire can be damaged as it is pulled through the slots. In a non-modular stator, the magnet wire must be pulled through individual slots that may be tens of meters long. The long stator slots result in much more contact and friction between wires in the slot, which places much more stress on the wire insulation and creates a much greater risk of damaging the insulation. This problem increases as more turns of wire are pulled through the slot, and is especially acute for the last turn of wire pulled through the slot. Long conventional ESP stators therefore use thicker insulation (e.g., at least 6 mils) than shorter stators. This thicker insulation is more expensive than thinner insulation and also reduces the copper fill in the slots, as compared to thinner insulated wires. Even if an open-slot stator core design (which allows the wires to be positioned in the slots without having to pull the wire through the slots) is used, the winding process is much more difficult than an equivalent winding process for a shorter stator section due to the length of the stator and the resulting difficulty in moving the stator core or winding apparatus to position the magnet wires in the slots.

These problems are addressed in the embodiments disclosed herein by using a modular type of stator construction. In these embodiments, the stator is not constructed as a single, elongated unit in which the coils extend along the entire length of the stator, but is instead constructed by manufacturing multiple smaller stator sections, and then connecting these stator sections end-to-end to form a stator of a desired length.

Using the smaller stator sections makes manufacturing less difficult because it is easier to form the magnet windings (the coils) in the slots of the stator (stator sections) when each stator is relatively short. For example, it is much easier to pull magnet wires through the slots of stator sections that are four to five feet long than slots of a single-unit stator that is 30 meters long. There is also a lower risk of damaging the wires as they are pulled through the slots.

Additionally, since there are gaps between the stator sections, the bearings that support the drive shaft and rotor (or rotor sections) are positioned at the gaps between the stator sections. The casings of the bearings can be secured in the stator housing by interference fit, which is unlike the bearings in a conventional stator. Conventionally, the bearing casings are secured by O-rings to the stator laminations that form the stator core. There is a clearance between the bearing casing outer diameter and lamination inner diameter, where the clearance allows the bearing casing to move radially and cause harmful vibrations. Additionally, the bearing can slip and spin in the circumferential direction, which causes heat to be generated in the motor.

Further, because the stator windings do not extend across the portions of the stator at the axial positions of the bearings, no energy is consumed by the windings at this point, although the end windings of each stator section (where the magnet wire crosses from one slot to another at the end of the stator section) offset this power savings to some degree. Also, because the stator windings do not extend across the portions of the stator at the axial positions of the bearings, the magnetic fields created by the windings are reduced at the positions of the bearings. Consequently, pitting of the bearings which is caused by unfiltered high frequency spikes from the variable frequency drive is reduced. Still further, the modular design allows the stator sections to be separable so that they can be more easily disassembled, repaired or reused.

Figures 3, 4:
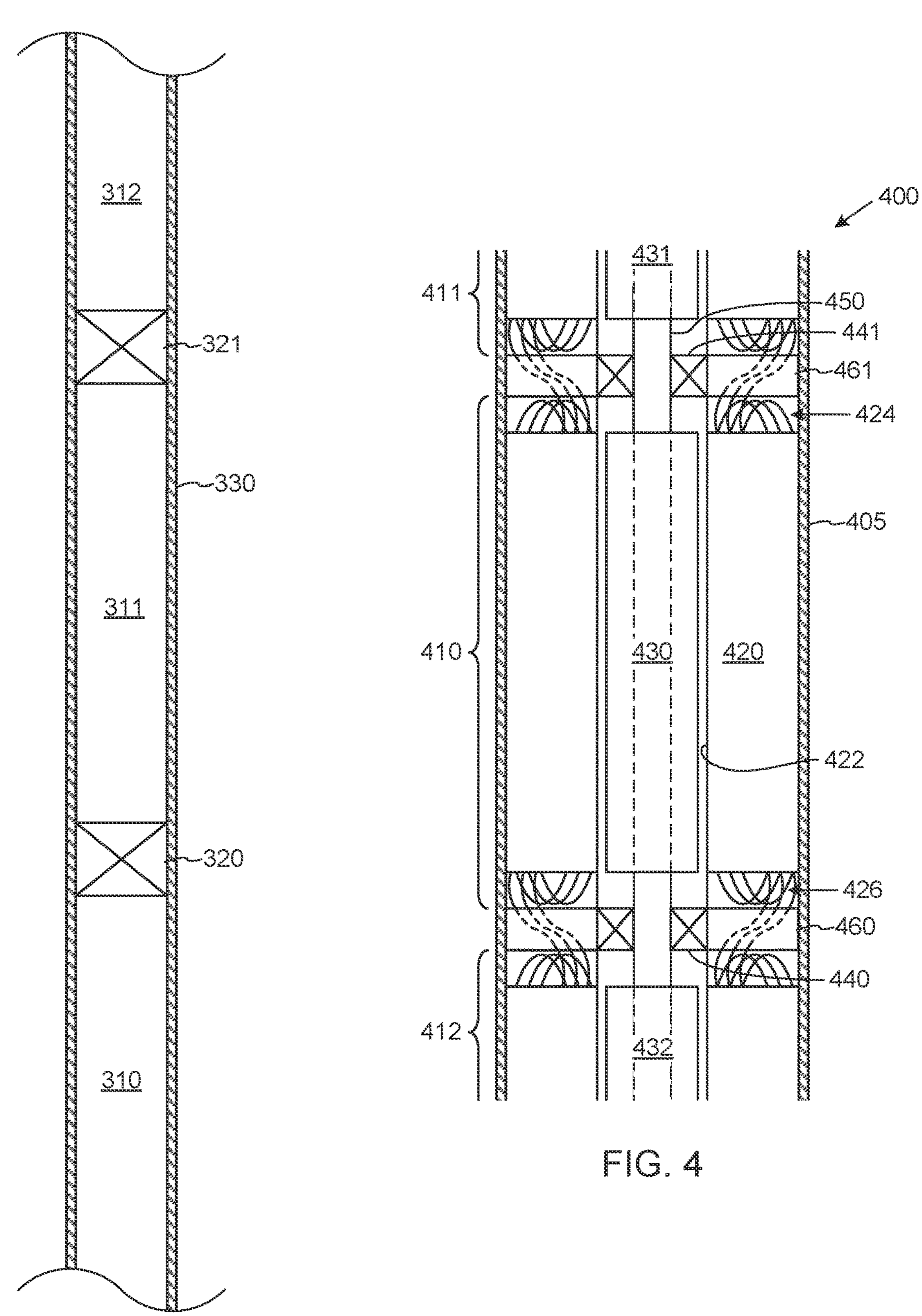
FIG. 3 is a diagram illustrating the end-to-end relationship of the stator sections in accordance with some embodiments.
FIG. 4 is a diagram illustrating the relationship of the different components of the stator sections and the rotor in some embodiments.

Referring to FIG. 3, a diagram illustrating the end-to-end relationship of the stator sections in accordance with some embodiments is shown. As depicted in the figure, three stator sections (310, 311, 312) are installed in a motor housing 330. Any desired number of stator sections can be used to form the stator for the motor. Stator sections 310-312 are positioned end-to-end with interconnect components (e.g., 320, 321) between each pair of adjacent stator sections. “Interconnect components” is used here simply to refer to any components that may be positioned between the stator sections, such as wiring to electrically connect the coils of the adjacent stator sections, and bearings or related structures for supporting the shaft and rotor in the bore of the stator.

Referring to FIG. 4, the relationship of the different components of the stator sections and the rotor in some embodiments are shown. FIG. 4 shows a portion of a downhole motor 400 that centers on one of the stator sections 410. Stator section 410 is positioned in end-to-end relation with adjacent stator sections 411 and 412. The stator sections are installed within a motor housing 405.

Stator section 410 has a core 420 that has a set of stator slots extending through it from one end to the other. Core 420 is typically formed by a set of stacked laminations, each lamination having the shape of the stator core’s cross-section. Coils of magnet wire are installed in the slots. The slots and coils of magnet wire installed in the slots are not explicitly shown in the figure.

The magnet wire can be installed in any suitable manner. If the stator core is a conventional closed-slot design, the wire is pulled through the slots to form the stator coils. Since the stator sections are relatively short, modular units, it is much easier to pull the wire through the slots of these modular stator sections than a single-unit stator of a length equivalent to the assembled stator sections. For example, it is easier to install coils in five four-foot stator sections than to install coils in one 20-foot stator. Increasing the ease with which the wire is pulled through the stator slots also allows the disclosed embodiments to achieve greater copper fill in the slots, which increases power density and efficiency of the motor.

It is also easier to install the magnet coils if the stator sections (and single-unit stator) use an open-slot design on which the wire can be externally wound. Some stator cores have a two-piece design comprising an inner portion that has slots which open outward (away from the axis of the stator core) and an outer portion that is installed over the inner portion to enclose the slots after the magnet wire has been installed in the slots. When this two-piece type of stator core is used, the inner core may be mounted on a mandrel that can be rotated lengthwise (end-to-end, rather than around the axis of the stator core) so that magnet wire on a stationary spool is wrapped around the core (in the desired slots) as the core is rotated. Because this method of installing the magnet wires in the stator slots involves lengthwise rotation of the core, a great deal of space is required simply to allow a long, single-unit core to be rotated. Further, it may be difficult to keep the wires properly positioned in the stator slots when the core is very long.

At each end of stator section 420 in FIG. 4, the end windings 424, 426 of the coils are shown. The end windings are simply the portion of the coils that extend from the ends of the stator core where the magnet wire of the coils traverses from one slot to another. The end windings are not a separate component of the coils, or of the stator, but are diagrammatically shown in the figure to illustrate that there is a portion of the stator length at which the stator does not generate the same concentrated magnetic fields that are generated in the bore adjacent to the rotor.

As depicted in FIG. 4, interconnects 460, 461 are positioned between adjacent stator sections (interconnect 460 is positioned between the end windings of stator sections 410 and 412, while interconnect 461 is positioned between the end windings of stator sections 410 and 411). Interconnects 460, 461 are used in this embodiment to connect the windings of one stator section to the windings of the adjacent stator section. Thus, currents passing through a coil in one stator section will also pass through the corresponding (connected) coil of the adjacent stator section, and so on. This may be referred to as a series interconnection of the coils. In alternative embodiments, magnet wires may be passed through the stator sections and interconnects so that the coils are connected in parallel, rather than in series. In some embodiments, interconnects 460, 461 may include structural components that are used to physically attach the adjacent stator sections to each other, support bearings 440, 441, or serve other structural purposes. Interconnect 460, 461, however, need not be separate structural components, and may simply comprise electrical connections between the wires of the different stator sections.

Stator core 420 has a bore 422 extending through it from one end to the other. A rotor having multiple rotor sections (e.g., 430) is coaxially positioned within bore 422. Rotor section 430 is secured to a shaft 450 (which is also coaxial with stator core 422 and rotor section 430), and the shaft is supported by bearings 440, 441. This allows shaft 450 and rotor section 430 to freely rotate within bore 422. Bearings 440, 441 may be supported by motor housing 405, the stator section(s), or some other fixed structure in the motor. Although the bearings depicted in the figure support only a portion of the shaft between adjacent rotor sections (e.g., between 430 and 431, or between 430 and 432), this is a non-limiting example, and the bearings could contact more of the shaft in other embodiments.

One of the features of motor 400 as illustrated in FIG. 4 is that stator core 420 and rotor section 430 are substantially coextensive in the axial direction (along the axis of the stator and rotor section). In other words, the length of stator core 420 is substantially the same as the length of rotor section 430, and each portion of stator section 420 is immediately adjacent to and substantially aligned with a corresponding portion of rotor section 430. Because substantially the entirety of stator core 420 is adjacent to a corresponding portion of rotor section 430, motor 400 does not waste energy generating magnetic fields in a portion of the stator that is not adjacent to the rotor section and consequently will generate an insignificant amount of torque. As noted above, this may be offset by the power consumed in the end windings of the stator sections. Further, because the portion of the stator that generates the magnetic fields is not adjacent to the bearings, unfiltered high frequency spikes in the drive signals provided to the stator the stator are less likely to cause pitting in the bearings.

Another of the features of motor 400 is that this design can be used to manufacture motors of different lengths using identical components. For a shorter, less powerful motor, a single stator section, or possibly just a few stator sections can be assembled to form the stator. If a longer, more powerful motor is needed, additional stator sections can be used. Since the different sizes of motors can be constructed using identical stator sections connected end-to-end, this design reduces the cost of maintaining inventory, as it is not necessary to stock different motors of different lengths. Instead, only the single stator section needs to be stocked, and this can be used to construct any desired length (and power) of motor.

Figure 5:
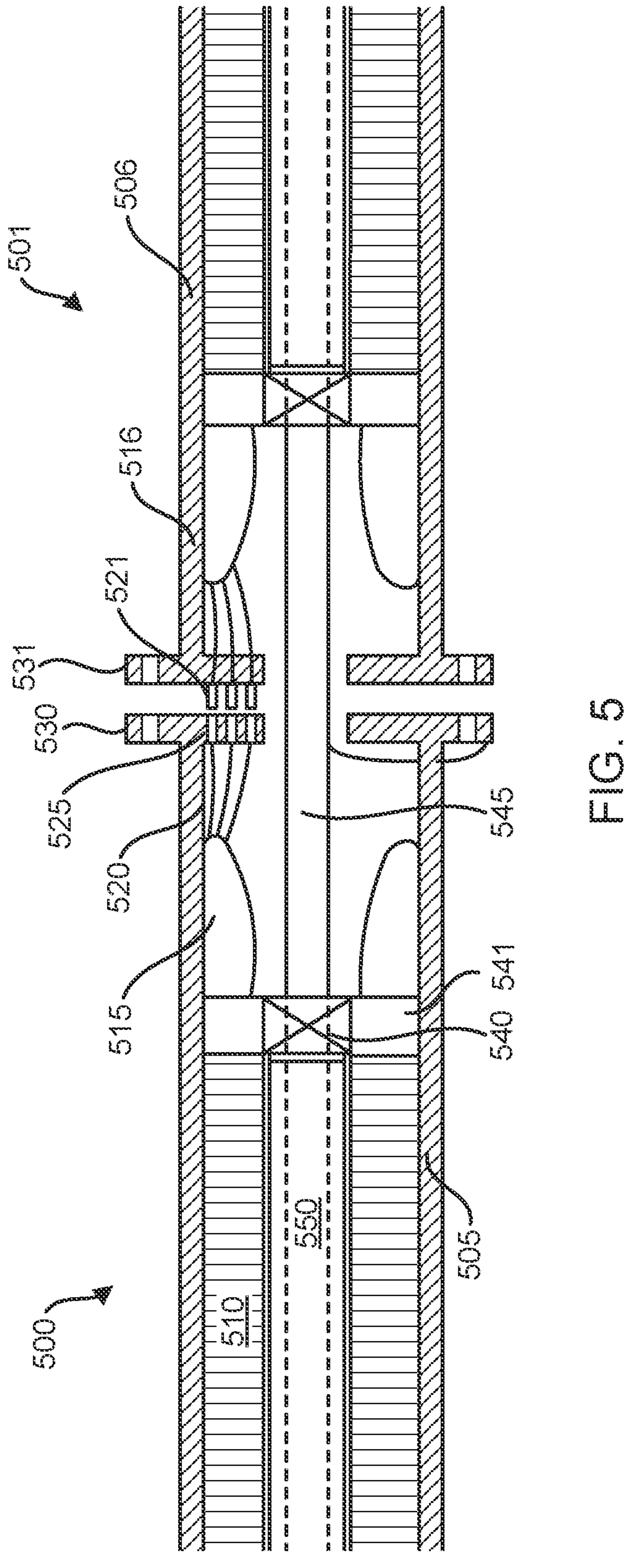
FIG. 5 is a diagram illustrating the structure of a downhole motor in accordance with an alternative embodiment.

Referring to FIG. 5, a diagram illustrating the structure of a downhole motor in accordance with an alternative embodiment is shown. In this embodiment, rather than installing one or more stator core sections within a single tubular motor housing as in the example of FIG. 4, the embodiment of FIG. 5 uses stator sections that are installed in individual motor housings that can be bolted together to form a stator of the desired length. It should be noted that stator sections 500 and 501 are identical, so the left end of stator section 500 (not shown in the figure) is the same as the left end of stator section 501 (shown in the figure). Likewise, the right end of stator section 501 (not shown in the figure) is the same as the right end of stator section 500 (shown in the figure). The right end of stator section 500 is shown next to the left end of stator section 501 in order to show the manner in which the two stator sections are connected to each other.

As depicted in FIG. 5, stator section 500 has a stator core 510 which comprises a set of stacked limitations that are installed in housing 505. Coils of magnet wire are installed in slots that extend through stator core 510. End windings 515 extend from the end of core 510. A lead 520 from each of the coils of magnet wire extends from end windings 515 to a female socket or receptacle 525 (a connector) which is mounted in a flange 530 at the end of housing 505. A bearing 540 is positioned at the end of stator core 510 to support the shaft 545 of the motor. Another bearing is positioned at the opposite end of stator core 510 (not shown in the figure) to support the shaft that that end of the stator section. The bearing carriers (e.g., 541) are interference fit within the inner diameter of the stator housing, giving the bearing more stability in comparison with the bearings conventional ESP motors.

A rotor section 550 is secured to shaft 545 in and is positioned in a bore that extends through stator core 510. Rotor section 550 is axially coextensive with (adjacent to) stator core 510 so that the stator coils do not use energy to generate magnetic fields where there is no corresponding portion of the rotor section (i.e., no magnets and supporting rotor core in the case of a permanent magnet motor, or no conductive bars and supporting core of an induction motor) and no torque can be generated. The end windings of the stator sections may offset these energy savings. Also, the bearings are positioned so that they are not at the same axial position as the stator core (i.e., the bearings are not positioned directly radially inward from the stator core, but are instead positioned at the gaps between stator cores) in order to reduce the magnetic fields generated by the stator at the bearings and thereby reduce pitting of the bearings due to unfiltered high frequency spikes in the power received from the variable frequency drive.

The left end of stator section is substantially a mirror image of the right end of stator section 500, except that each lead 521 from the coils of magnet wire in stator section 501 extends from end windings 516 to a male pin 521 (a connector) which is mounted in flange 531 at the end of housing 506. When stator section 500 is connected to stator section 501 (by bolting them together at flanges 530, 531), the male pins of stator section 501 engage the female receptacles of stator section 500, thereby electrically connecting the windings of the coils in stator section 500 to the windings of the coils in stator section 501. Although not explicitly shown the figure, o-rings or other types of seals are positioned between the flanges to prevent fluids external to the motor from entering the motor. As in the embodiment of FIG. 4, this interconnect between stator sections may alternatively be configured to simply pass through electrical power so that the coils of the different stator sections may be connected in parallel rather than in series. Each pair of stator sections in the final stator assembly is connected in the same manner.

The foregoing embodiments are intended to be illustrative of the invention rather than limiting, and alternative embodiments may use means other than those described above to implement the corresponding functionality. The various embodiments may provide one more of the advantages described above, including lower electrical losses in portions of the stator sections having bearings, longer bearing life due to lower electrical stresses in the bearings, easier and less expensive manufacturing processes, more repeatable manufacturing processes, more granularity in horsepower ratings of motors (i.e., ability to add horsepower by adding stator sections, more flexible connectivity within the motor (serial or parallel connection of coils), etc.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed by the claims of the application.

What is claimed is:

1. An electric submersible pump (ESP) system comprising:

a pump;

a motor configured to drive the pump, the motor having an elongated cylindrical stator and a rotor which is concentrically positioned within a bore through the stator, wherein the stator is configured to generate magnetic fields directed radially inward to drive the rotor to rotate within the bore;

wherein the stator comprises a plurality of separable interconnected modular stator sections, wherein each of the modular stator sections comprises a corresponding stator housing defining a longitudinal length that is greater than an outer diameter of the modular stator section; and for each pair of adjacent stator sections, a corresponding interconnect that electrically connects coils of magnet wire in the stator sections to a power source, wherein each corresponding interconnect comprises a set of connectors which are engaged by securing the pair of adjacent stator sections to each other, wherein the stator housing of each stator section having, at each end, a corresponding flange configured to secure the stator housing to the stator housing of the adjacent stator section, and wherein each flange has a subset of the connectors mounted thereon, such that when facing flanges of adjacent stator sections are secured to each other, the connectors mounted on the facing flanges are engaged with each other and are isolated from an external wellbore environment.

2. The ESP system of claim 1, wherein the interconnect electrically connects coils of magnet wire in a first one of the pair of adjacent stator sections to coils of magnet wire in a second one of the pair of adjacent stator sections in a serial configuration.

3. The ESP system of claim 1, for each pair of adjacent stator sections, the corresponding interconnect comprises a first end portion of a first one of the pair of adjacent stator sections and a second end portion of a second one of the pair of adjacent stator sections.

4. The ESP system of claim 3, wherein each of the stator sections has a corresponding stator core; wherein for each of the stator sections, the corresponding stator core does not extend axially into the corresponding end portion.

5. The ESP system of claim 4, further comprising, for each pair of adjacent stator sections, a corresponding bearing positioned within the end portions of the pair of adjacent stator sections, the bearing supporting a shaft of the rotor coaxially within the stator.

6. The ESP system of claim 1, wherein the coils of magnet wire in successive ones of the stator sections are connected by the interconnects to a power source in parallel to each other.

7. The ESP system of claim 1, wherein each of the modular stator sections is identical.

8. The ESP system of claim 1, wherein the stator comprises a plurality of gaps between stator cores of the stator sections, wherein the rotor comprises a plurality of rotor core sections separated by bearings that support a shaft of the rotor coaxially within the stator, wherein the bearings are positioned at axial locations which are coincident with the gaps between stator cores of the stator sections.

9. The ESP system of claim 8, wherein the rotor core sections are coextensive with the stator cores of the stator sections.

10. A downhole motor comprising:

an elongated cylindrical stator configured to generate magnetic fields directed radially inward; and a rotor which is concentrically positioned within a bore through the stator and is driven by magnetic fields generated by the stator to rotate within the bore;

wherein the stator comprises a plurality of separable interconnected modular stator sections, wherein each of the modular stator sections comprises a corresponding stator housing having, at each end, a corresponding flange configured to secure the stator housing to the stator housing of the adjacent stator section, and wherein each corresponding stator housing defines a longitudinal length that is greater than an outer diameter of the corresponding stator housing;

wherein each stator section has a set of connectors that engage a corresponding set of connectors of an adjacent one of the stator sections to electrically connect coils of magnet wire in the stator section to coils of magnet wire in the adjacent stator section, wherein each flange has a subset of the connectors mounted thereon such that the connectors engage simultaneously with the securing of the flanges and are isolated from an external wellbore environment; and wherein the stator comprises a gap between stator cores of each pair of adjacent stator sections, the stator further comprising a plurality of bearings that support a shaft of the rotor, wherein the bearings are positioned at axial locations which are coincident with the gaps between the stator cores of the adjacent stator sections.

11. The downhole motor of claim 10, wherein the sets of connectors electrically connect coils of magnet wire in a first one of the pair of adjacent stator sections to coils of magnet wire in a second one of the pair of adjacent stator sections in a serial configuration.

12. The downhole motor of claim 10, wherein the coils of magnet wire in successive ones of the stator sections are connected by the corresponding sets of connectors to a power source in parallel to each other.

* * * * *